United States Patent [19]
Boone et al.

[11] Patent Number: 5,701,989
[45] Date of Patent: Dec. 30, 1997

[54] CONVEYOR FOR REMOVING AN ARTICLE CONVEYED ABREAST OF ANOTHER ARTICLE

[75] Inventors: Joseph T. Boone, Greenville, Ind.; Thomas Anthony Hillerich, Jr., Louisville, Ky.; Gerald Robert Grispart, Woodbridge, N.J.; Edward Ydoate, Louisville, Ky.

[73] Assignee: Sandvik Sorting Systems, Inc., Louisville, Ky.

[21] Appl. No.: 654,193

[22] Filed: May 28, 1996

Related U.S. Application Data

[63] Continuation-in-part of Ser. No. 388,450, Feb. 14, 1995, abandoned.

[51] Int. Cl.$^6$ ............................................. B65G 47/12
[52] U.S. Cl. ........................... 198/448; 198/443; 198/786
[58] Field of Search ............................ 198/443, 447, 198/448, 453, 786

[56] References Cited

U.S. PATENT DOCUMENTS

| 4,044,897 | 8/1977 | Maxted | 198/448 X |
| 5,147,023 | 9/1992 | Meindl | 198/448 |
| 5,222,586 | 6/1993 | Ydoate et al. | 198/447 |
| 5,501,315 | 3/1996 | Loomer | 198/448 |
| 5,531,311 | 7/1996 | LeMay et al. | 198/448 |

FOREIGN PATENT DOCUMENTS

| 0306121 | 12/1988 | Japan | 198/453 |

*Primary Examiner*—James R. Bidwell
*Attorney, Agent, or Firm*—Burns, Doane, Swecker & Mathis, L.L.P.

[57] ABSTRACT

An article removal conveyor includes first and second conveying lanes disposed in parallel alongside one another and driven in a manner imparting mutually divergent conveying forces. The first conveying lane has a conveying surface with a higher coefficient of friction than that of the second conveying lane so that any articles contacting the first conveying lane will be controlled by that lane.

21 Claims, 6 Drawing Sheets

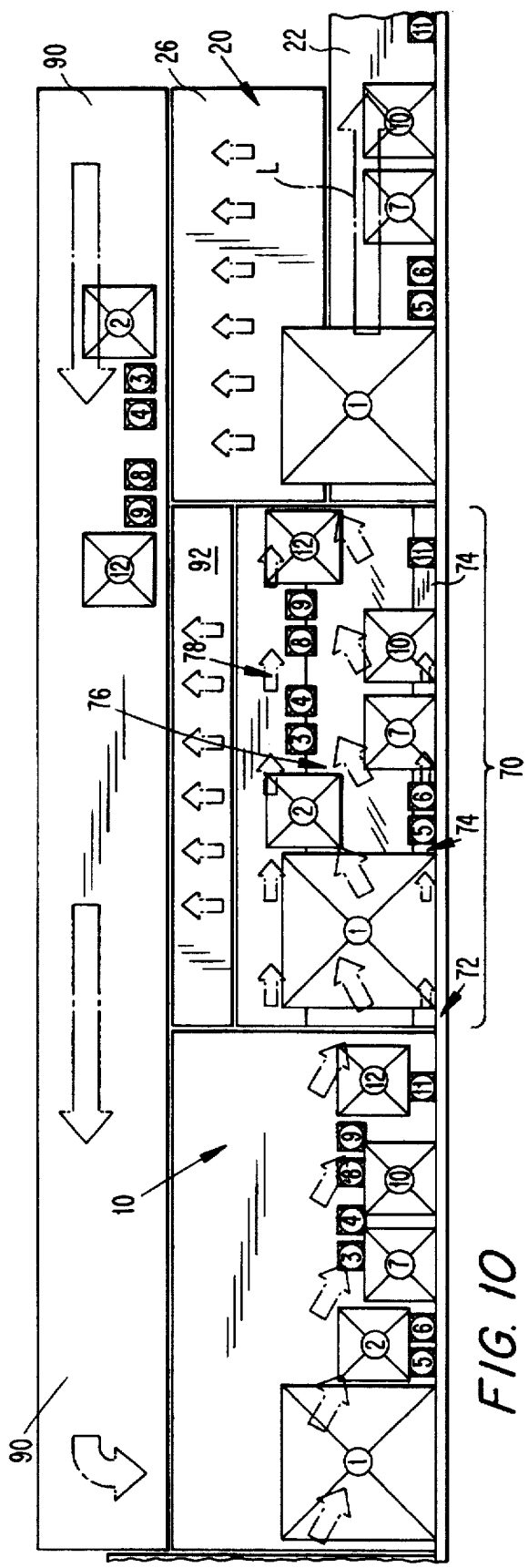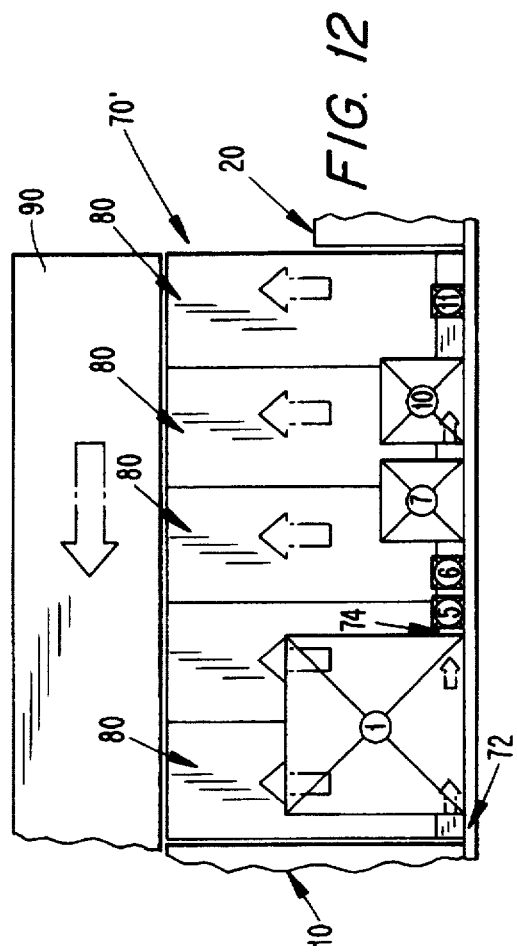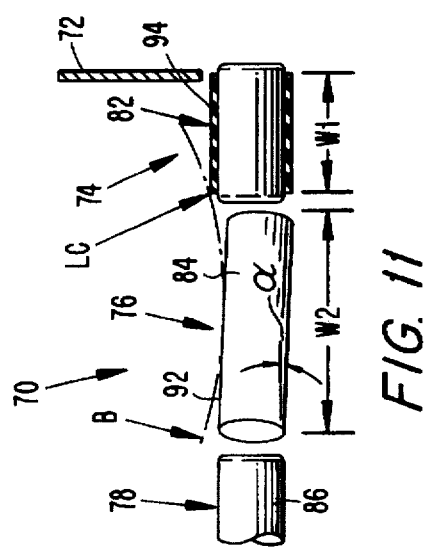
FIG. 10
FIG. 12
FIG. 11

CONVEYOR FOR REMOVING AN ARTICLE CONVEYED ABREAST OF ANOTHER ARTICLE

RELATED INVENTION

This is a Continuation-In-Part of Ser. No. 08/388,450 filed Feb. 14, 1995, and now abandoned.

BACKGROUND OF THE INVENTION

The present invention relates to the positioning of articles, such as packages, into a single file.

It is known to provide a conveying system which receives a flow of randomly arranged articles, such as packages to be mailed, and orients the packages into a single column or file so that the packages can be fed one-at-a-time to a sorter mechanism. The sorter mechanism includes a scanner which reads a code on each package, and a diverter which diverts the packages to particular travel paths in response to the data read from the code, e.g., a mailing address.

As depicted in FIG. 1 the conventional conveying system typically comprises an unscrambler or singulator conveyor 10 which has a series of driven rollers 12 whose rotary axes are skewed relative to a longitudinal direction of travel so that the packages are conveyed simultaneously longitudinally forwardly (in direction L) and laterally inwardly toward a side wall 16. As a result, the packages tend to become united in single file traveling longitudinally along the side wall. Such a conveyor is disclosed for example in U.S. Pat. No. 4,039,074.

Upon exiting the outlet 18 of the singulator conveyor 10, the line of packages is conveyed to the sorter mechanism to be directed to respective stations in accordance with a code marked on the packages.

Packages may sometimes leave the singulator conveyor while traveling abreast, i.e., in side-by-side relationship (e.g., see packages P1 and P2 in FIG. 1) which will interfere with proper operation of the sorter mechanism, since the scanner is able to read a code from only one package at a time. Consequently, a flow control mechanism 20 (shown in FIG. 1) has been proposed for the purpose of causing an outer one P2 of the side-by-side packages to be removed. Such a flow control mechanism 20, which is disclosed in U.S. Patent 5,222,586, comprises a conveyor belt 22 positioned to receive packages exiting the singulator conveyor 10. The width of the belt 22 is such that any package whose center of gravity G (assumed for conveyor-designing purposes to lie at the geometrical center of the package) is situated laterally to the outside of the outer edge 24 of the belt 22 will fall onto a discharge chute 26. This means that an excessively wide package will fall onto the chute, as will the outer one P2 of two side-by-side traveling packages P1, P2 in most instances.

It may on occasion occur, however, that the center of gravity of the outer package, e.g. package P4 of the side-by-side traveling packages, will be situated laterally inside of the outer edge 24 of the belt 22 and thus be carried onto a downstream conveyor 28, e.g., a belt for conveying packages to a scanner mechanism. As pointed out earlier, a scanner mechanism is not able to properly read the codes on packages traveling in side-by-side relationship.

It would be desirable therefore, to provide a mechanism for more reliably preventing packages from entering the conveyor 28 in side-by-side relationship.

SUMMARY OF THE INVENTION

The invention relates to a conveyor mechanism for conveying single-file articles in a forward direction while removing articles travelling laterally adjacent the single-file articles. The conveyor mechanism comprises first and second driven conveyor structures respectively forming first and second conveying lanes disposed in parallel as viewed in plan and situated immediately adjacent one another. The first and second conveying 10 lanes apply first and second conveying forces respectively, which are divergent relative to one another. The first conveying force includes a forward directional component. The second conveying force includes a lateral directional component extending away from the first lane to move articles away from the first lane that are out of contact with the first lane.

The first and second conveyor structures have first and second conveying surfaces, respectively. The first conveying surface preferably has a substantially higher coefficient of friction than the second conveying surface.

Preferably, the first conveying force has no lateral directional component, i.e. the first conveying force extends in a longitudinal direction. The second conveying force preferably includes forward and lateral directional components.

A third conveyor mechanism may be provided which forms a third conveying lane disposed immediately laterally adjacent the second lane and extending parallel thereto as viewed in plan. The third lane applies a third conveying force having a forward directional component.

The second lane can be disposed at a lower elevation than the first lane and can be inclined downwardly toward the first lane.

A stationary wall can be disposed adjacent one edge of the first conveying lane in order to guide the articles. Alternatively, an additional second lane can be disposed alongside an edge of the first conveying lane situated opposite the initially described second conveying lane. Articles would be fed to the first conveying lane along a center longitudinal axis thereof.

In another aspect of the invention, the conveyor mechanism comprises a driven conveyor forming a first conveying lane applying a conveying force having a forward directional component. The conveying lane includes first and second lateral edges and is inclined downwardly at a first angle from the first lateral edge to the second lateral edge. The conveyor mechanism also includes a chute forming a top surface which has a first lateral edge disposed immediately laterally adjacent the second lateral edge of the conveying lane. The chute surface has a smaller coefficient of friction than the conveying lane and is inclined downwardly from the first lateral edge of the chute surface at a second angle substantially equal to the first angle to enable articles disposed out of contact with the conveying lane to gravitate away from the conveying lane.

The present invention also relates to a method of conveying articles, the method utilizing a conveyor mechanism comprised of first and second conveyors forming first and second conveying lanes, respectively. The conveying lanes are disposed in parallel as viewed in plan and are situated immediately adjacent one another. The first and second conveying lanes apply first and second conveying forces, respectively, which are divergent relative to one another. The first conveying lane includes a conveying surface having a higher coefficient of friction than a conveying surface of the second conveying lane. The method comprises the steps of:

A) conveying, in a forward direction, articles contacting only the first conveying lane, and articles contacting both the first and second conveying lanes; and B) moving laterally away from the first conveying lane, articles contacting the second conveying lane and being out of contact with the first conveying lane.

BRIEF DESCRIPTION OF THE DRAWINGS

The objects and advantages of the invention will become apparent from the following detailed description of a preferred embodiment thereof in connection with the accompanying drawing in which like numerals designate like elements, and in which:

FIG. 10 is a schematic top plan view of a conveying system according to another embodiment of the invention, depicting packages being conveyed through the system;

FIG. 11 is an end elevational view depicting the relationship between three conveying lanes of a removal conveyor depicted in FIG. 10;

FIG. 12 is a fragmentary schematic top plan view of yet another embodiment of the invention;

DETAILED DESCRIPTION OF PREFERRED EMBODIMENTS OF THE INVENTION

Figure 2:
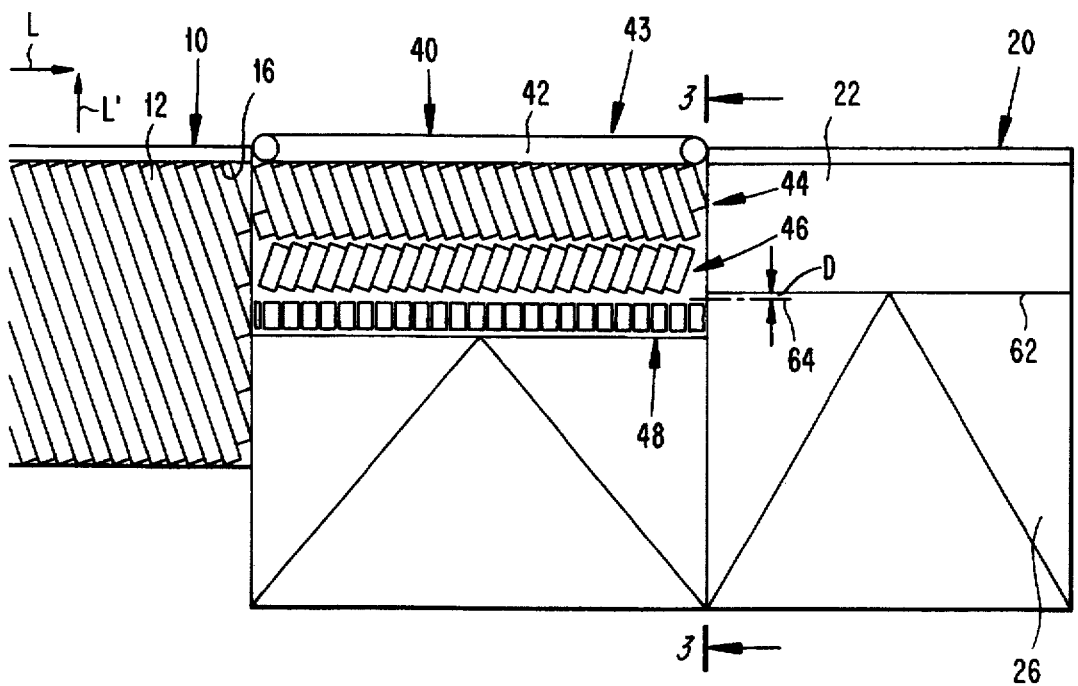
FIG. 2 is a plan view of a conveying system according to the present invention.
Figure 3:
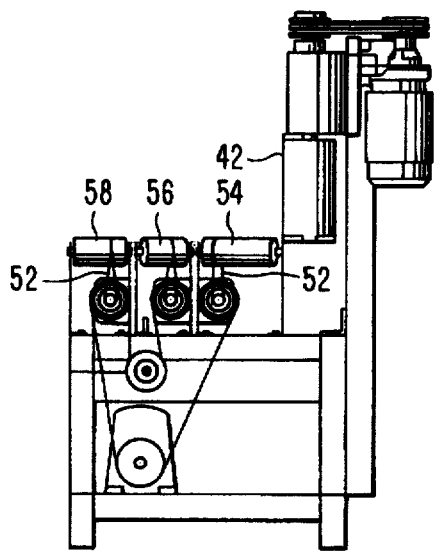
FIG. 3 is a view taken in the direction of arrows 3—3 in FIG. 2.

A conveyor system according to the present invention is depicted schematically in top plan view in FIG. 2. Depicted therein is the downstream end of the previously described conventional unscrambler or singulator conveyor 10 which has skewed rollers 12 for advancing articles, such as packages, in a direction having a longitudinal forward component L and a lateral inward component L' Hence, the packages are advanced forwardly while being arranged in single file against a vertical side wall 16.

Figure 1:
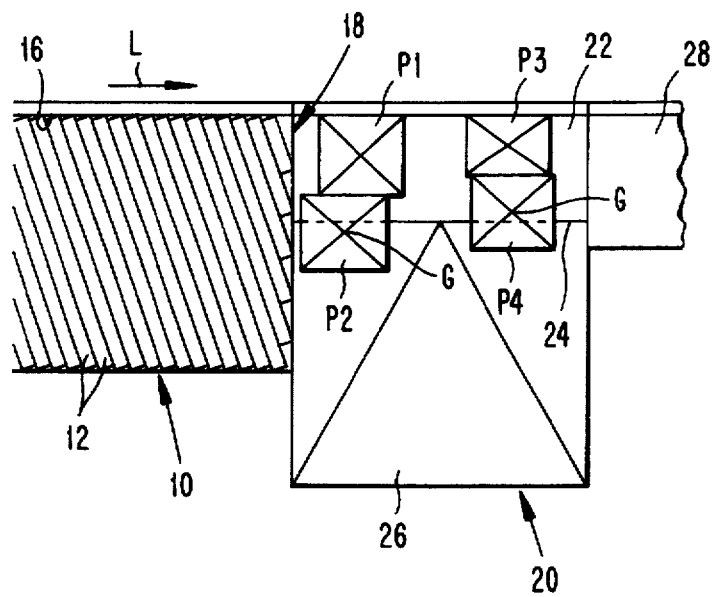
FIG. 1 is a plan view of a conveying system according to the prior art.

As indicated earlier in connection with FIG. 1, it may occur that packages exit the singulator conveyor 10 in side-by-side relation. It is necessary that one of those packages be removed in order to avoid the situation where two packages travel simultaneously to a scanner mechanism. As explained earlier in connection with FIG. 1, this is usually accomplished by means of the conventional flow control mechanism 20, but under certain conditions, side-by-side packages may pass through the flow mechanism.

In order to prevent such an occurrence, the present invention concerns a removal conveyor 40 positioned between the singulator conveyor 10 and the flow control mechanism 20.

The removal conveyor comprises a vertical inner side wall 42 formed by a driven endless belt 43 which travels in the longitudinal forward direction L. A horizontal conveyor mechanism is provided which comprises a first or inner conveyor lane 44, a second or middle conveyor lane 46 and an optional third or outer conveyor lane 48, all arranged in parallel as viewed in plan. Each of those conveyor lanes comprises a row of rollers 54, 56, 58 driven by a conventional drive mechanism, e.g., motor-driven endless bands 52. The rollers 54, 56, 58 lie in a common horizontal plane.

Alternatively, the conveyor lanes could be comprised of belts, i.e., each conveyor lane could comprise a plurality of conveyor belts arranged in parallel and traveling in the intended direction of the respective lane. Thus, for example, the belts of the inner lane 44 would be inclined toward the belt 43, and the belts of the middle lane 46 would be inclined toward the outer lane. The outer lane 48 would comprise a single belt traveling the direction of arrow L.

The conveying lanes are designed so that each lane advances packages longitudinally forwardly, and furthermore so that: (i) the inner lane 44 applies a lateral inward force to the packages, (ii) the middle lane applies a lateral outward force to the packages, and (iii) the outer lane 48 applies no lateral outward force to the packages. (Preferably, the outer lane 48 applies no lateral force whatsoever to the packages.) The manner in which this is achieved will now be explained.

The rollers 54 of the inside lane are skewed such that their lateral outer ends 54 are situated forwardly of their lateral inner ends 54. Consequently, the inside lane 44 applies to packages a conveying force acting in a direction having the longitudinal forward component L and the lateral inward component L. Hence, packages advanced by the inner lane are also biased against the inner side wall 42. The rotary speed of the inner lane rollers is preferably selected in order to advance packages longitudinally forwardly at the same speed as the inner side wall 42.

The rollers 56 of the middle conveyor lane 46 are skewed such that their lateral inner ends 56 are disposed forwardly of their lateral outer ends 56'. Thus, the middle lane 46 applies to packages a conveying force acting in a direction having both the longitudinal forward component L and a lateral outward component L". Thus, the first and second lanes 44, 46 apply first and second conveying forces, respectively, which are mutually divergent.

The rollers 58 of the outer conveyor lane 48 have their axes oriented perpendicular to the longitudinal direction L and thus apply to packages a conveying force acting solely in the longitudinal direction L.

Figure 4:
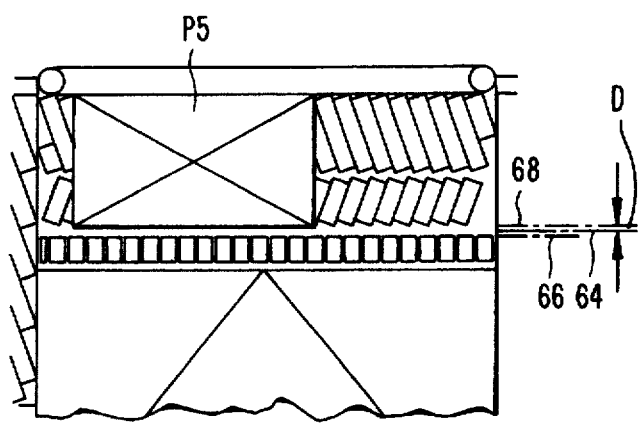
FIG. 4 is a plan view of a removal conveyor of the present invention when a first size package is being conveyed thereon.
Figure 5:
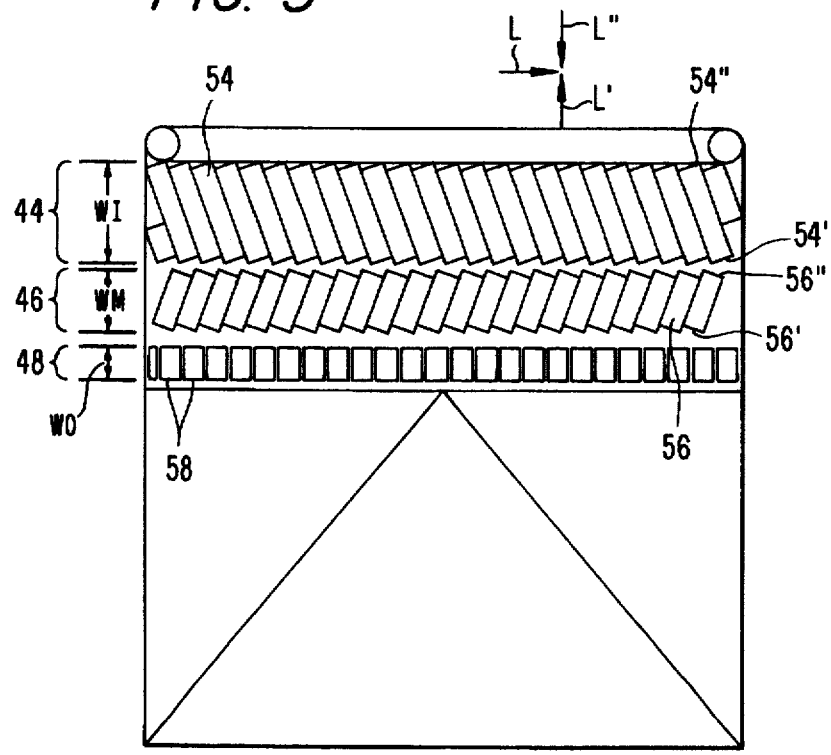
FIG. 5 is a top plan view of the removal conveyor with no packages conveyed thereon.

It is necessary that the inner and middle lanes 44, 46 operate so that a package P5 (see FIG. 4) that is wide enough to extend entirely across only the inner and middle lanes 44, 46 will be moved laterally inwardly (as well as longitudinally forwardly), i.e., that the package P5 will be under the control of the inner lane from the standpoint of lateral movement. That is achieved in the preferred embodiment by (a) skewing the rollers 54, 56 of the inner and middle lanes at the same angle relative to the longitudinal direction (as viewed in plan), (b) making the inner rollers 54 longer than the middle rollers 56 so that the width WI of the inner lane is larger than the width WM of the middle lane (i.e., WI>WM), and (c) driving the inner and middle rollers at the same speed. It will be appreciated, however, that other arrangements are possible for ensuring that the lateral movement of the packages is controlled by the inner lane.

It is also required that a package P6 (see FIG. 6) which is wide enough to extend entirely across all three lanes 44, 46, 48 will be moved laterally inwardly (as well as longitudinally forwardly). As noted above, the middle rollers 56 are unable to move such a package P6 laterally outwardly, so that requirement can be achieved by ensuring that the outer rollers 58 do not impose a sufficiently large lateral outward force on the package which, when combined with the lateral outward force of the middle rollers, is able to overcome the lateral inward force applied by the inner rollers 54. This can be accomplished by arranging the outer rollers 58 such that they impose no lateral force on the packages, preferably by mounting those rollers for rotation about axes oriented perpendicular to the longitudinal direction. Hence, only a longitudinal force would be imposed on the packages by the outer rollers. Of course, it may be possible to skew the outer rollers 58 so that they impart a slight lateral outward or lateral inward force, without causing the inner rollers to lose control over the lateral movement of the packages.

Figure 6:
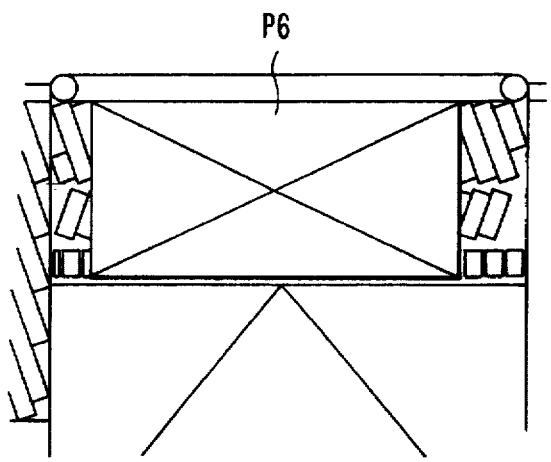
FIG. 6 is a view similar to FIG. 4 with a second size package being conveyed thereon.
Figure 7:
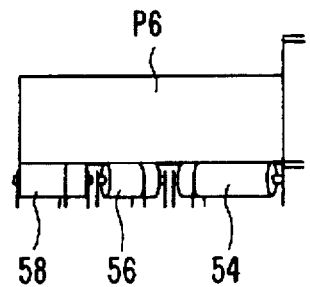
FIG. 7 is a front end view of FIG. 6.
Figure 8:
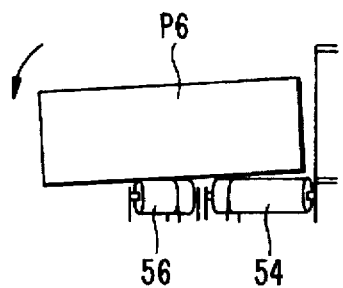
FIG. 8 is a view similar to FIG. 7 depicting what would occur if the outer conveyor lane were not present.

The primary purpose for the provision of the outer conveyor lane 48 can be understood with reference to FIGS. 6-8. It will be appreciated that in the absence of the outer lane 48, the package P6 would tilt and rise off the rollers 54 of the inner lane (as shown in FIG. 8), whereupon the package P6 would come under the control of the middle lane and be displaced laterally outwardly off the outer edge of the removal conveyor 40. That is undesirable, as the package P6 is not intended to be removed. However, due to the presence of the outer lane 48, the package P6 will remain seated on all three lanes, and will be urged against the side wall as explained above.

Figure 9:
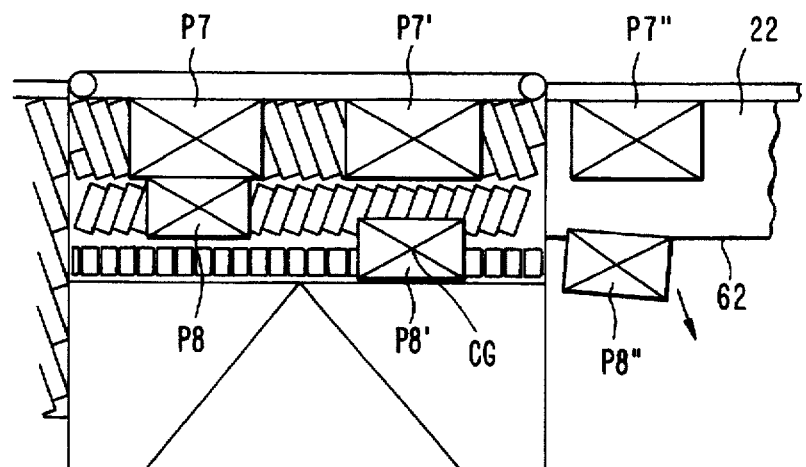
FIG. 9 is a view similar to FIG. 6, depicting what would occur if packages are conveyed thereon in side-by-side relationship.

It will be appreciated, then, that the purpose for providing the outer lane is to prevent the undesired removal of the very wide packages P6 without preventing the desired removal of an outer package traveling abreast of an inner package, as will be later explained in connection with FIG. 9.

A further requirement of the removal conveyor 40 is that a package riding on both the middle and outer lanes, but not on the inner lane (e.g., see the package position P8' shown in FIG. 9), must become oriented so that when discharged onto a downstream conveyor, such as a flow control conveyor 20, the center of gravity CG of the package lies laterally outside of the outer edge 62 of the downstream conveyor and will fall off that edge 62. That is accomplished in the preferred embodiment by making the outer lane 48 shorter in width than the middle lane (i.e., WM>WO), and driving the outer rollers 58 at a speed such that the forward longitudinal speed component of the middle rollers 56 is the same as that of the outer rollers. This involves rotating the outer rollers 58 slightly slower than the middle rollers 56 since the middle rollers are skewed but the outer rollers are not.

The operation of the removal conveyor in removing a package will now be explained with reference to FIG. 9. In FIG. 9 a pair of packages, (i.e., inner and outer packages P7, P8) have exited the singulator in side-by-side relationship, and it is necessary to remove the outer package P8. The inner package P7 comes under the influence solely of the rollers 54 of the inner lane 44 and is advanced thereby longitudinally forwardly and laterally inwardly against the moving side wall 42.

The outer package P8 initially comes under the influence solely of the rollers of the middle lane 46 and is advanced thereby longitudinally forwardly and laterally outwardly toward the outer lane 48. Eventually, the outer package P8 will contact the rollers 58 of the outer lane 48 and assume an equilibrium position P8' partially on the outer lane and partially on the inner lane, whereby the center of gravity CG of the package (assuming that the package is of symmetrical mass) becomes offset laterally outwardly of the outer edge 68 of the middle lane. Hence, when the outer package P8 is transferred onto the flow control conveyor belt 22, its center of gravity will be offset laterally outwardly of the outer edge 62 of that belt 22, whereupon the package P6 will fall off the flow control conveyor belt 22 at position P8". That package P6 can travel down a conveyor of the chute 26 and be collected for recycling back to the singulator conveyor 10.

It will be appreciated that the package P8 would be removed as described above even if an inner edge thereof had been initially riding on the inner lane, i.e., if the package P7 were of slightly less width, because the middle lane would exert lateral control over the package. Hence, such a package would eventually be displaced laterally outwardly to the position P8'.

As noted earlier, the outer lane could be arranged to provide a slight lateral inward or outward movement to the packages without adversely affecting the ability of the removal conveyor to remove the outer package. If a slight lateral inward movement is provided, it is merely necessary to ensure that the outer edge 62 of the downstream conveyor 20 is positioned so as to lie laterally inside of the center of gravity of packages being conveyed only by the outer and middle lanes. In doing so, the assumption is made that the packages are symmetrical, i.e., the center of gravity coincides with the geometrical center of the package.

It will be appreciated that the present invention provides a high degree of assurance that packages will be advanced only in single file to a sorting mechanism.

A second embodiment of the invention is depicted in FIGS. 10 and 11 wherein the removal conveyor 70 comprises a vertical inner side wall comprised of a fixed plate 72. A conveyor mechanism comprises a first or inner conveyor lane 74, a second or middle conveyor lane 76, and an optional third or outer conveyor lane 78, all arranged in parallel as viewed in plan. Those lanes could comprise driven belts or driven rollers.

The first lane 74 has a width W1 which is smaller than the width of the narrowest product. The width W2 of the second lane 76 is preferably greater than the width W1. The width of the optional third lane 78 can be any desired size.

The first and second lane 74, 76 apply first and second conveying forces, respectively, which are mutually divergent. That is, the first lane 74 applies a conveying force having only a forward longitudinal component, and the second lane 76 applies a conveying force having both a forward longitudinal component and a lateral outward component. Thus, the resultant conveying force of the second conveyor is inclined at an obtuse angle with respect to the longitudinal direction. In that event, the speed of the second lane will be set so that it has a forward longitudinal component equal to the forward speed of the first lane, so that a package resting on both of the first and second lanes will travel forwardly without being rotated.

Alternatively, and as shown in FIG. 12, the second conveyor of the removal conveyor 70' could apply a conveying force having only a lateral outward component. That is, the conveying force would be directed perpendicular to the longitudinal direction and thus would be divergent with respect to the force applied by the first lane. In that event, the second conveyor 76 could comprise parallel belt strips 80, as shown in FIG. 12, or driven rollers could be employed instead.

Returning to FIG. 11, the first lane 74 preferably comprises a belt 82; the second lane 76 preferably comprises rollers 84 which are skewed similar to the earlier described rollers 56. The optional third lane 78 preferably comprises rollers 86. Of course, the first lane 74 could instead comprise rollers, and each of the second and third lanes could comprise belts.

Since the first lane 74 is not applying a force having a laterally inward component toward the wall 72 (as in the case of the earlier-described rollers 54), it is necessary to take other measures to ensure that a package engaging both the first and second lanes 74, 76 will be controlled by the first lane. To achieve this, the first lane 74 is provided with a conveying surface having a substantially higher coefficient of friction than the second lane 76. For example, the first lane 74 could comprise a belt (or covered rollers) having a coefficient of friction in the range of about 1.0 to 1.2, and the second lane could comprise rollers whose outer surfaces have a coefficient of friction of about 0.3.

Thus, the first lane 74 would exhibit a coefficient of friction three to four times as large as the second lane 76. In the event that a package, such as the package No. 7 in FIG. 10 has a width sufficient to overlap the first and second lanes, the first lane will control the direction of travel of the package, due to its higher coefficient of friction.

In that regard, FIG. 10 depicts the travel pattern of a set of packages Nos. 1–12 as they travel from the singulator conveyor 10 to the removal conveyor 70, and then to the flow control structure 20. It will be appreciated that the in-line package Nos. 1, 5, 6, 7, 10 and 11 which at least partially engage the first lane 74 are conveyed in a longitudinal forward direction L. On the other hand, the package Nos. 2, 3, 4, 8, 9 and 12, which are traveling laterally adjacent the single-file packages and which engage only the second lane 76, are displaced laterally outwardly until reaching the junction with the third conveyor 78 and then are conveyed forwardly on both of those lanes until reaching a downwardly inclined chute 26 of the flow control structure 20. At that point, the package Nos. 2–4, 8, 9 and 12 slide down the chute 26 onto a return conveyor 90 which takes them back to the singulator conveyor 10. Also a downwardly inclined chute 92 is situated alongside the third lane 78 for a similar purpose.

In the absence of the optional third lane 78, package Nos. 2–4, 8, 9 and 12 would have been displaced by the second lane directly onto the chute 92.

It might be desirable to provide the first lane 74 in the form of rollers that are slightly skewed in the manner of the earlier described rollers 54 to urge the packages forwardly and laterally inwardly against the wall 72, in addition to providing the higher coefficient of friction.

Another feature of the present invention deals with a problem involving packages having a convexly curved bottom B as depicted in broken lines in FIG. 11. It will be appreciated that such a curved bottom, even though it may overlap both the first and second lanes 74, 76, might tend to contact only the second lane 76 and thus will be unnecessarily sent to the return conveyor 90.

In accordance with the present invention, however, the curved bottom is more likely to make at least line contact with the first lane 74. In that regard, the conveying surface 92 of the second lane 76 is situated slightly lower than the conveying surface 94 of the first lane 74, and is inclined downwardly slightly toward the first lane at an angle α (e.g., about 2°). As a result, curved package bottoms B will tend to become oriented such that at least line contact LC is made with an edge of the first lane 74. Due to the high coefficient of friction of the conveying surface of the first lane 74, the first lane will control the direction of travel of the package.

Figure 13:
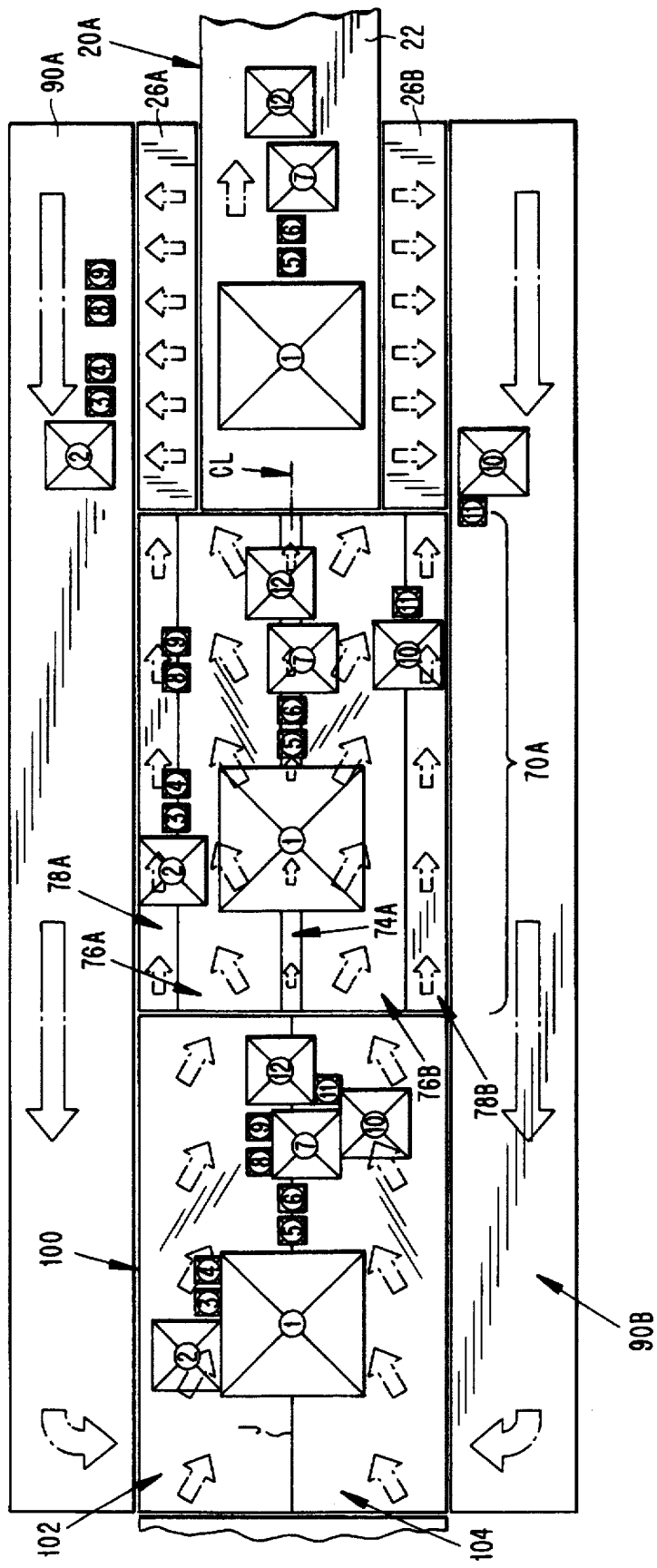
FIG. 13 is a view similar to FIG. 10 of yet another embodiment of the present invention.

A further embodiment of the invention is disclosed in connection with FIG. 13 wherein a removal conveyor 70A is symmetric about a longitudinal center line CL thereof. In that regard, the center line CL bisects a first lane 74A which corresponds to the first lane 74 of FIG. 10. Disposed on one side of the first lane 74A are a second lane 76A and an optional third lane 78A corresponding to the second and third lanes 76, 78, respectively, of FIG. 10. Disposed to the opposite side of the first lane 74A are another second lane 76B and another optional third lane 78B corresponding to the first and second lanes 74A, 76A.

Situated upstream of the removal conveyor 70A is a feed conveyor 100 which comprises a pair of parallel, side-by-side, identical feed conveyor lanes 102, 104, each of which feeds packages in a skewed direction having a forward longitudinal component, and a lateral inward component extending toward the other feed lane. As a result, packages tend to be fed along the longitudinal junction J between the feed lanes, which junction J is aligned with the center line CL of the first lane 74A of the removal conveyor 70A. Packages which contact that first lane 74A upon leaving the infeed conveyor 100, i.e., package Nos. 1, 7, and 12 in FIG. 13 will be controlled by the first lane 74A, even if a part of the package contacts one of the second lanes 76A or 76B, due to the higher coefficient of friction of the conveying surface of the first lane 74A.

Packages which are out of contact with the first lane 74A, such as package Nos. 2, 3, 4, 8, 9, 10 and 11 in FIG. 13 will be displaced laterally outwardly to the junction between the respective pair of second and third lanes 76A, 78A or 76B, 78B and will fall onto a chute 26A or 26B of a flow control conveyor 20A, and then be returned to an upstream end of the infeed conveyor 100 by one of the return conveyors 90A, 90B.

The lanes 74A, 76A, 78A, 76B, 78B can comprise belts or rollers, as desired. Also the second lanes 76A, 76B could be configured to displace packages in a direction having only a laterally outward component, like the second lane 80 disclosed earlier in connection with FIG. 12.

Figure 14:
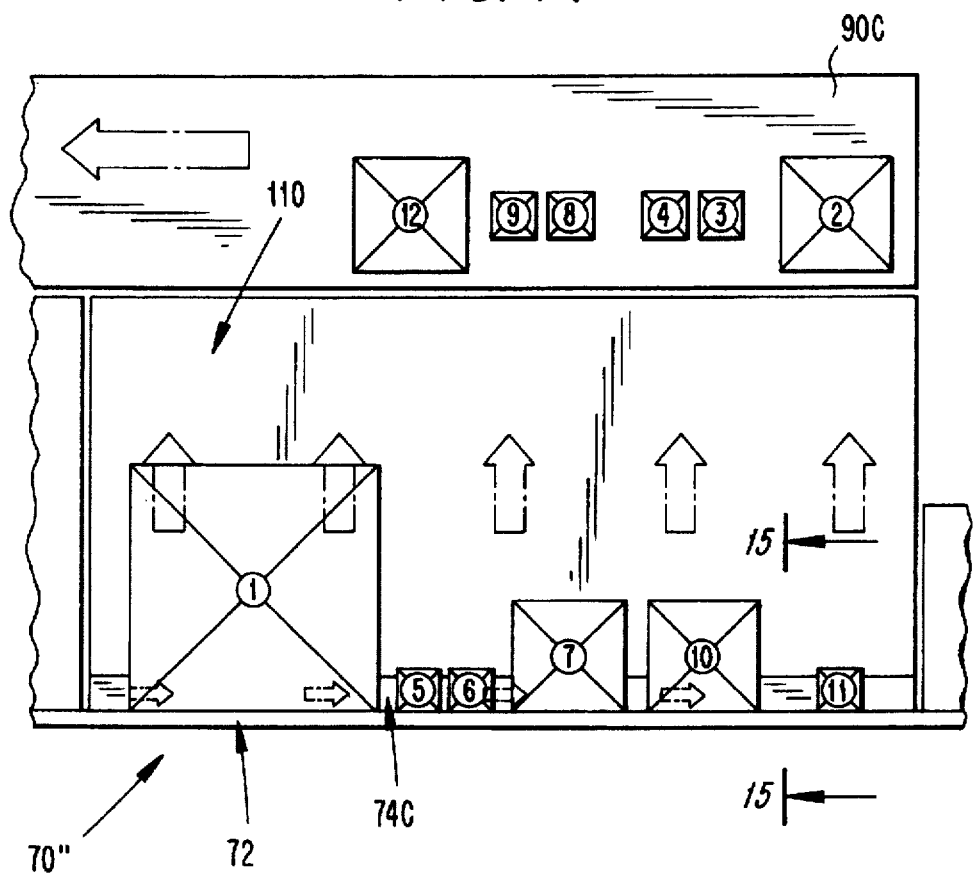
FIG. 14 is a schematic top plan view of still another embodiment of the present invention.
Figure 15:
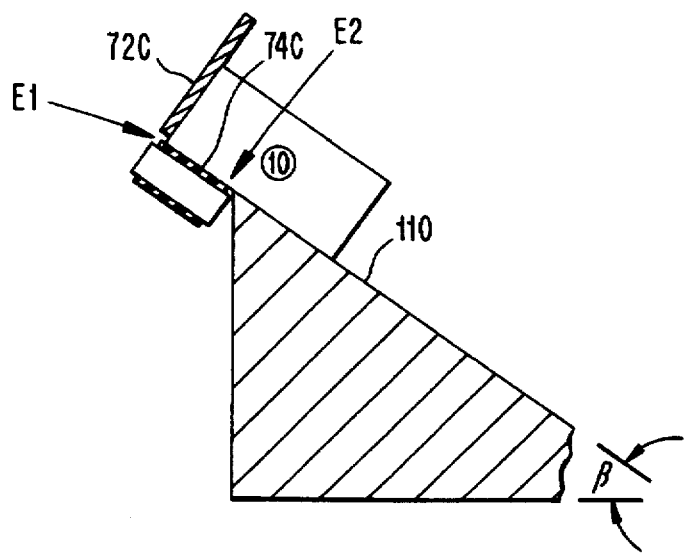
FIG. 15 is a sectional view taken along the line 15—15 of FIG. 14.

Yet another embodiment of a removal conveyor 70" is depicted in FIGS. 14 and 15. That removal conveyor 70" includes a conveyor lane 74C comprised of a driven conveyor structure, and a chute 110. The conveying surface of the conveyor lane 74C and the surface of the chute 110 are substantially coplanar and oriented at an oblique angle β relative to horizontal. That is, the conveyor lane is inclined downwardly from a first lateral edge E1 thereof to a second lateral edge E2 thereof. The conveying surface of the conveyor lane 74C has a higher coefficient of friction than the surface of the chute 110. The conveyor lane 74C may comprise a driven belt or driven rollers. Packages can be fed to the return conveyor 70" by a conveyor that is also inclined by angle β.

It will be appreciated that packages (such as package No. 10 in FIG. 15) which contact the conveying surface of the conveyor lane 74C will be advanced in a longitudinal forward direction, due to the high frictional coefficient of the conveying surface thereof. Conversely, packages which contact only the chute 110 will slide down the chute 110 and onto a return conveyor 90C. Also, the chute could be defined by a series of non-driven rollers that are freely rotatable about axes oriented parallel to the longitudinal direction of the return conveyor 70" The outer peripheries of the rollers would together form a chute surface.

The embodiment according to FIGS. 14, 15 requires the provision of only a single driven conveyor lane 74C; the other "lane" 110 need not be driven since packages will be displaced either by the high-friction driven conveyor lane 74C (in the case of packages which contact both the conveyor lane 74C and the chute), or by gravity (in the case of packages contacting only the chute).

Although the present invention has been described in connection with a preferred embodiment thereof, it will be appreciated by those skilled in the art that additions, deletions, modifications and substitutions not specifically described may be made without departing from the spirit and scope of the invention as defined in the appended claims.

What is claimed:

1. A conveyor mechanism for conveying single-file articles in a forward direction while removing articles traveling laterally adjacent the single-file articles, the conveyor mechanism comprising first and second driven conveyor structures respectively forming first and second conveying lanes disposed in parallel as viewed in plan and situated immediately adjacent one another; the first and second conveying lanes applying first and second conveying forces, respectively, which are divergent relative to one another; the first conveying force including a forward directional component; the second conveying force including a lateral directional component extending away from the first lane to move articles away from the first lane that are out of contact with the first lane.

2. The conveyor mechanism according to claim 1, wherein the first and second conveyor structures have first and second conveying surfaces, respectively, the first conveying surface having a substantially higher coefficient of friction than the second conveying surface.

3. The conveyor mechanism according to claim 2, wherein the first conveying force has no lateral directional component.

4. The conveyor mechanism according to claim 3, wherein the second conveying force includes a forward directional component in addition to the lateral directional component.

5. The conveyor mechanism according to claim 4 further including a third conveyor mechanism forming a third conveying lane disposed immediately laterally adjacent the second lane and disposed parallel thereto as viewed in plan, the third lane applying a third conveying force having a forward directional component.

6. The conveyor mechanism according to claim 2, wherein the second conveying force includes a forward directional component in addition to the lateral directional component.

7. The conveyor mechanism according to claim 6, wherein a speed of articles conveyed by the first lane has a forward directional component equal to a forward directional component of a speed of articles conveyed by the second lane.

8. The conveyor mechanism according to claim 2, wherein the second lane is disposed at a lower elevation than the first lane.

9. The conveyor mechanism according to claim 8, wherein the second lane is inclined downwardly toward the first lane.

10. The conveyor mechanism according to claim 2, wherein the second lane is inclined downwardly toward the first lane.

11. The conveyor mechanism according to claim 1, wherein the second lane is inclined downwardly toward the first lane.

12. The conveyor mechanism according to claim 8, further including a third driven conveyor structure forming a third conveying lane disposed immediately laterally adjacent the second lane and extending parallel thereto as viewed in plan, the third lane arranged to apply a third conveying force having a forward directional component.

13. The conveyor mechanism according to claim 2, further including a third driven conveyor structure forming a third conveying lane disposed immediately laterally adjacent the second lane and disposed parallel thereto as viewed in plan, the third lane arranged to apply a third conveying force having a forward directional component.

14. The conveyor mechanism according to claim 2, wherein the first conveyor mechanism includes a driven belt; the second conveyor mechanism including driven rollers.

15. The conveyor mechanism according to claim 2, wherein a width of the first lane is less than a width of a narrowest article being conveyed by the conveyor mechanism.

16. The conveyor mechanism according to claim 2, wherein there are two of the second conveying lanes disposed on opposite sides of the first lane.

17. The conveyor mechanism according to claim 16, further including an infeed conveyor for feeding articles to a longitudinal center line of the first conveyor.

18. The conveyor mechanism according to claim 2, further including an upright side wall disposed along a lateral side of the first lane opposite the second lane, the second conveying force including a lateral directional component, in addition to the forward component such that the first conveying force urges articles toward the wall.

19. A conveyor mechanism for conveying single-file articles in a forward direction while removing articles traveling laterally adjacent the single-file articles, the conveyor mechanism comprising a driven conveyor forming a conveying lane applying a conveying force having a forward directional component; the conveying lane including first and second lateral edges and being inclined downwardly at a first angle from the first lateral edge to the second lateral edge; and a chute having a first lateral edge disposed immediately laterally adjacent the second lateral edge of the conveying lane, the surface having a smaller coefficient of friction than the conveying lane and being downwardly inclined from the first lateral edge of the surface at a second angle substantially equal to the first angle to enable articles disposed out of contact with the conveying lane to gravitate away from the conveying lane.

20. A conveyor mechanism comprising inner, middle, and outer parallel conveying lanes and an upright side wall disposed adjacent an inner edge of said inner lane; each of said conveying lanes arranged to advance articles longitudinally forwardly, and furthermore said inner lane arranged to range articles laterally inwardly toward said side wall; said middle lane arranged to urge articles laterally outwardly away from said side wall.

21. A method of conveying articles, the method utilizing a conveyor mechanism comprised of first and second conveyors forming first and second conveying lanes, respectively, disposed in parallel as viewed in plan and situated immediately adjacent one another, the first and second conveying lanes applying first and second conveying forces, respectively, which are divergent relative to one another; the first conveying lane including a conveying surface having a higher coefficient of friction than a conveying surface of the second conveying lane, the method comprising the steps of:

A) conveying in a forward direction: articles contacting only the first conveying lane, and articles contacting both the first and second conveying lanes; and B) moving, laterally away from the first conveying lane, articles contacting the second conveying lane and being out of contact with the first conveying lane.

* * * * *